United States Patent [19]

Hamada

[11] Patent Number: 5,668,658

[45] Date of Patent: Sep. 16, 1997

[54] TRANSFER OF REPEATER INFORMATION SIGNALS IN IN-LINE OPTICAL AMPLIFIER REPEATER SYSTEM

[75] Inventor: Satoshi Hamada, Tokyo, Japan

[73] Assignee: NEC Corporation, Tokyo, Japan

[21] Appl. No.: 395,309

[22] Filed: Feb. 28, 1995

[51] Int. Cl.⁶ ............................ H04B 10/00; H01S 3/00
[52] U.S. Cl. .......................... 359/341; 359/173; 359/179
[58] Field of Search ................................ 359/341, 160, 359/173, 179

[56] References Cited

U.S. PATENT DOCUMENTS

| | | | |
|---|---|---|---|
| 5,229,876 | 7/1993 | Fatehi et al. | 359/341 |
| 5,436,750 | 7/1995 | Kawano | 359/177 |

FOREIGN PATENT DOCUMENTS

| | | |
|---|---|---|
| 6097555 | 4/1984 | Japan . |
| 2-266245 | 10/1990 | Japan . |
| 3205929 | 9/1991 | Japan . |
| 3280731 | 11/1991 | Japan . |
| 6021896 | 1/1994 | Japan . |
| 6104840 | 4/1994 | Japan . |

OTHER PUBLICATIONS

S. Matsuoka et al., "Supervisory Signal Transmission Methods For Optical Amplifier Repeater Systems", IEEE 1990, pp. 1846–1850.

Y. Sato et al., "Optical Time Domain Reflectometry in Optical Transmission Lines Containing In–Line Er–Doped Fiber Amplifiers", *Journal of Lightwave Technology*, vol. 10, No. 1, Jan. 1992, pp. 78–83.

*Primary Examiner*—Nelson Moskowitz
*Attorney, Agent, or Firm*—Sughrue, Mion, Zinn, Macpeak & Seas

[57] ABSTRACT

A multi-repeater optical transmission system comprises a plurality of repeaters which are respectively provided with oscillators for generating oscillation waves of different frequencies. The respective oscillation waves are frequency-modulated according to repeater information signals respectively generated in the repeaters. According to the frequency-modulated oscillation waves, respective pumping sources are operated to emit pumping lightwaves for pumping Er-doped fiber amplifiers. The respective pumping lightwaves carrying the repeater information signals are sent out to a transmission line through a wavelength division multiplexing fiber coupler.

23 Claims, 5 Drawing Sheets

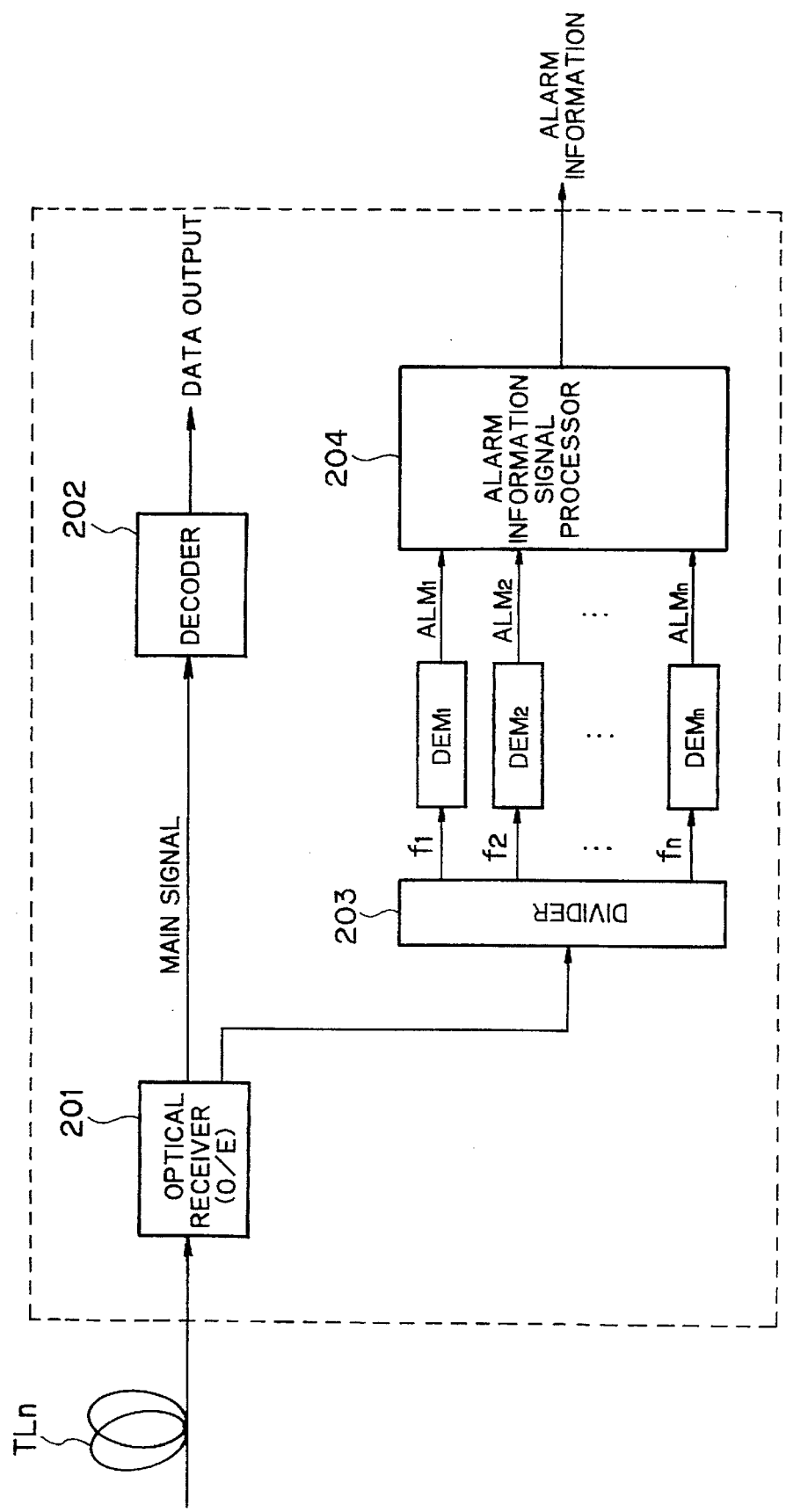

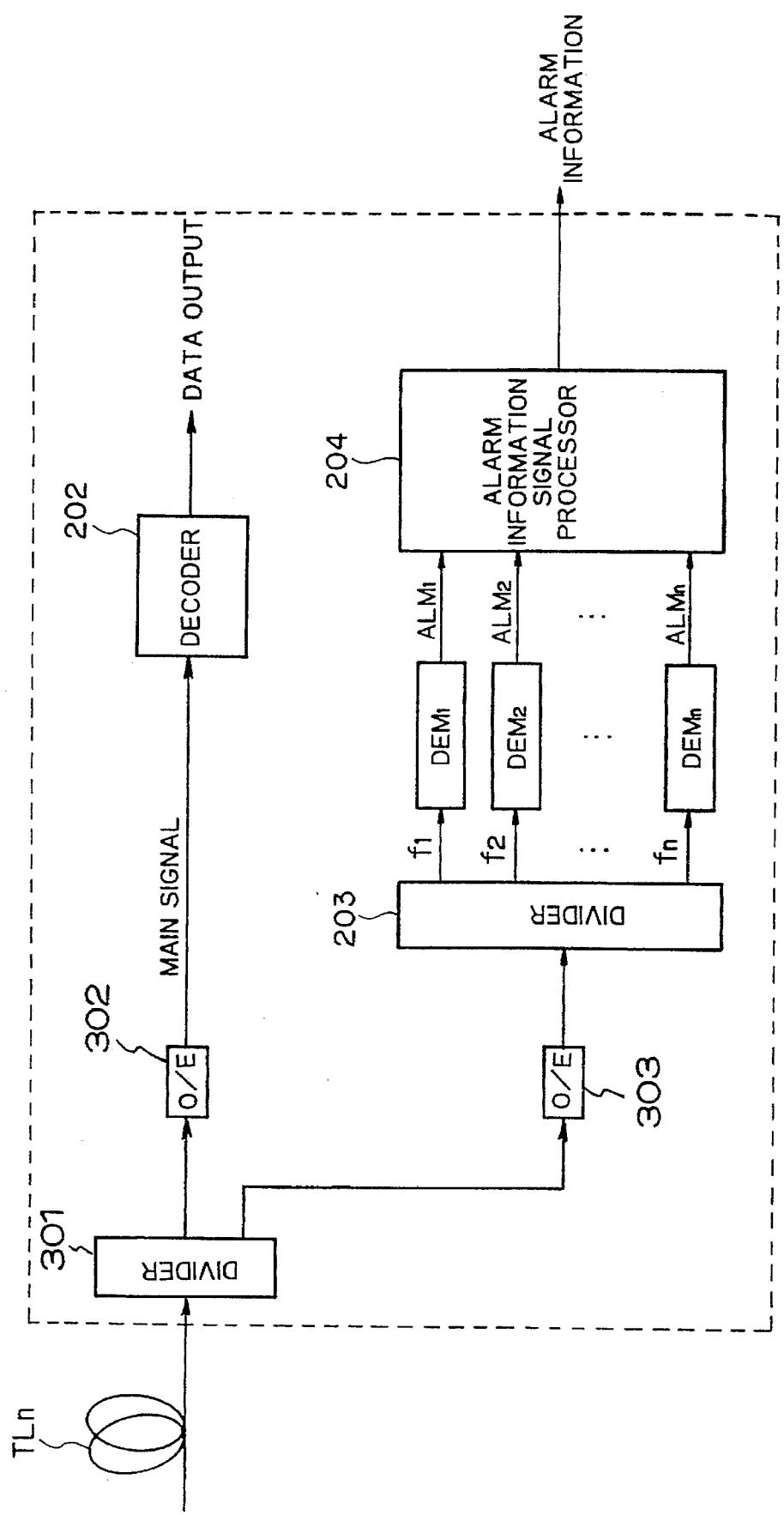

1

TRANSFER OF REPEATER INFORMATION SIGNALS IN IN-LINE OPTICAL AMPLIFIER REPEATER SYSTEM

BACKGROUND OF THE INVENTION

1. Field of the Invention

The present Invention relates to an optical transmission system which transmits a signal via a plurality of optical repeaters each including an in-line optical amplifier such as an optical fiber amplifier and, more specifically, to a system for transferring repeater information signals which are respectively generated in the optical repeaters.

2. Description of the Prior Art

In a multiple-repeater optical transmission system that transmits an optical signal via a plurality of repeaters, some failure may occur in a transmission line or a repeater, resulting in a possible serious failure in the transmission system. Therefore, it is necessary to always supervise the repeaters and transmission lines and to immediately inform a receiving terminal and a control terminal of a failure upon its detection.

An example of a supervisory method in an optical transmission system Is disclosed in Japanese Unexamined Patent Publication No. 2-266245. In this method, an Er(erblum)-doped fiber is used as an in-line optical amplifier, and pumping light is modulated by a pulse pattern whose period is shorter than the relaxation time of pumping carriers. This pumping light modulation causes the pulse pattern to be sent to an optical fiber transmission line. An optical loss and a failure position of the optical fiber transmission line is determined by calculating a time correlation between the above pulse pattern and a pulse pattern of backscattered light returning from the optical fiber transmission line. Although this type of supervisory method is effecting in supervising the optical fiber transmission line, it cannot provide effective information when a failure occurs in a repeater.

By analogical inference from this supervisory method using the pumping light modulation, a system may be conceivable in which each repeater is provided with a supervisory device and failure information in each repeater is superimposed on a main optical signal and is transmitted downstream. More specifically, a carrier of a predetermined frequency is digitally modulated in accordance with the failure information, and pumping light for the Er-doped fiber is generated in accordance with the modulated carrier. Accordingly, this system can achieve both optically amplification of the main signal through the Er-doped fiber pumped by the pumping light and transfer of the failure information carried by the pumping light in a state of being superimposed on the main signal.

However, the above failure information transfer system has the following problem. Since the modulation frequency for superimposition of failure information is the same for all the repeaters, when failures occur simultaneously in two or more repeaters, respective pieces of failure information cannot be transferred being superimposed on the main signal. Therefore, it is difficult to identify two or more failure repeaters, respectively. This is a factor of reducing the reliability of the optical transmission system.

SUMMARY OF THE INVENTION

An object of the present invention is to provide an information transfer method and system which can improve the reliability of a multiple-repeater optical transmission system.

Another object of the invention is to provide an information transfer method and system which enables a network controller to identify which repeater is suffering from some failure.

A multi-repeater optical transmission system according to the present invention is comprised of a plurality of repeaters which are respectively provided with oscillators generating oscillation waves of different frequencies. The respective oscillation waves are used as carriers for frequency-modulation. More specifically, the respective oscillation waves are frequency-modulated in accordance with repeater information signals generated in the respective repeaters. In other words, such frequency-modulation causes the oscillation wave to carry the repeater information signal. According to the frequency-modulated oscillation waves, respective pumping sources are operated to emit pumping lightwaves for pumping optical fiber amplifiers. At the same time, the respective pumping lightwaves carrying the repeater information signals are sent out to a transmission line through an optical fiber coupler.

In a receiving terminal in the optical transmission system, received line-signal light is converted into an electrical line signal. The line signal is divided into a plurality of signals having different frequencies respectively corresponding to the oscillation waves generated in the repeaters. The respective signals having different frequencies are demodulated into the repeater information signals which have been generated in the repeaters.

BRIEF DESCRIPTION OF THE DRAWINGS

FIG. 5 is a block diagram showing an example of a receiving terminal of the embodiment; and FIG. 6 is a block diagram showing another example of a receiving terminal of the embodiment.

DESCRIPTION OF THE PREFERRED EMBODIMENTS

Figure 1:
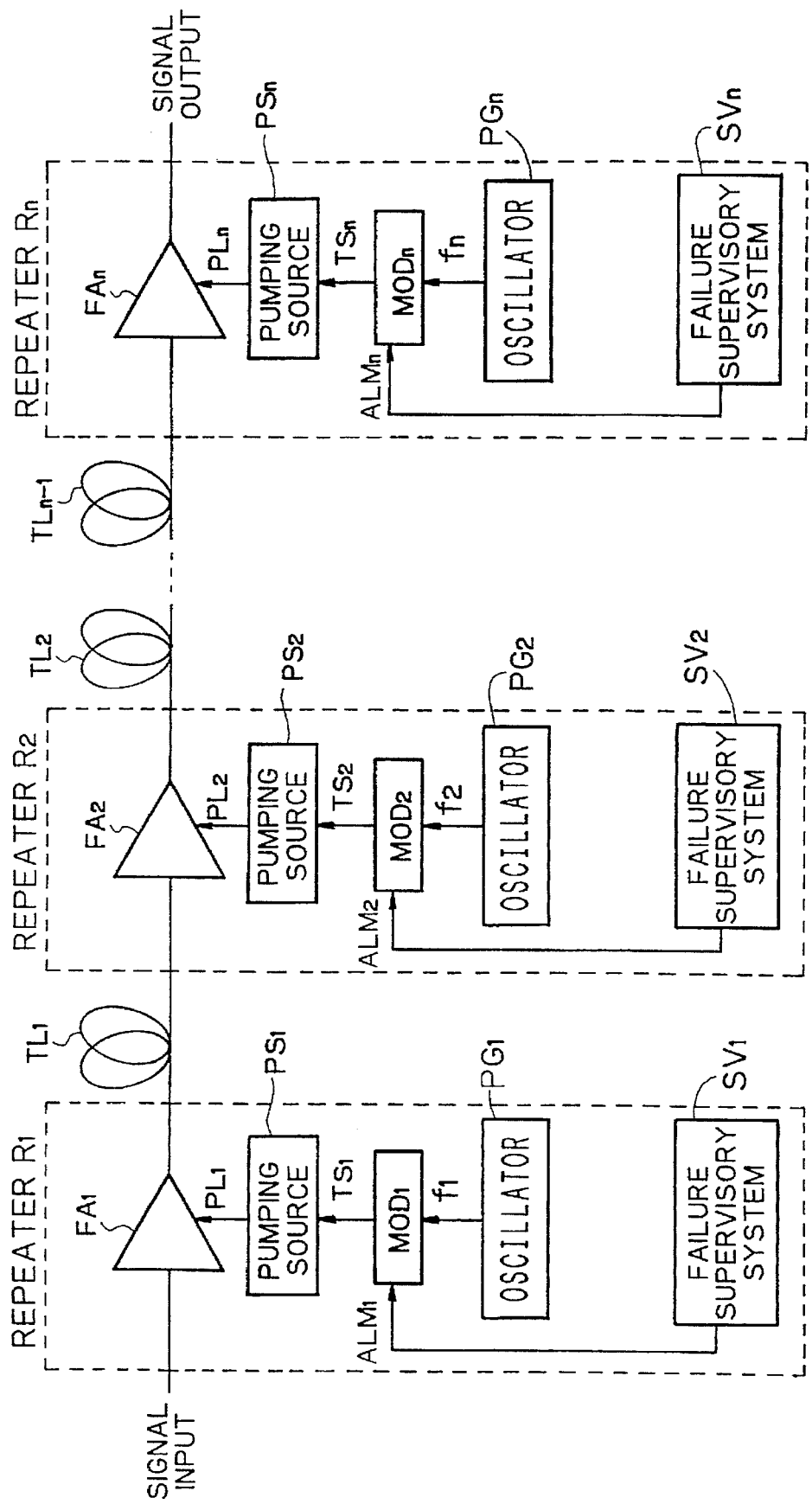
FIG. 1 is a schematic diagram illustrating an embodiment of an optical transmission system according to the present invention.

As shown in FIG. 1, in a multiple-repeater optical transmission system comprising a plurality of optical fiber transmission lines $TL_1$–$TL_n$ and a plurality of repeaters $R_1$–$R_n$ connecting adjacent transmission lines to each other, each repeater $R_i$ (i=1, 2, 3, ..., n) is comprised of a known failure supervisory system $SV_i$, an oscillator $PG_i$, a modulator $MOD_i$, a pumping source $PS_i$, and an optical fiber amplifier $FA_i$. When detecting a failure, for instance, within the repeater $R_i$, the failure supervisory system $SV_i$ generates an alarm information signal $ALM_i$ indicating "abnormality". The oscillator $PG_i$ generates an oscillation wave having a frequency different from that of the oscillator $PG_j$ of any other repeater $R_j$. As described later, the frequencies $f_1$–$f_n$ for those oscillation waves, which are in a predetermined range, are assigned in advance to the respective repeaters (see FIG. 4).

The modulator $MOD_i$ frequency-modulates the oscillation wave of frequency $f_i$ generated by the oscillator $PG_i$ in accordance with the alarm information signal $ALM_i$, and supplies a modulated oscillation wave $TS_i$ to the pumping source $PS_i$. While the repeater $R_i$ operates normally and therefore the alarm Information signal $ALM_i$ indicates "normal", the modulated oscillation wave $TS_i$ is, for instance, an oscillation wave having a predetermined constant frequency. The pumping source $PS_i$ emits pumping light $PL_i$ for pumping the optical fiber amplifier $FA_i$ in accordance with the frequency-modulated oscillation wave $TS_i$. The optical fiber amplifier $FA_i$ of each repeater $R_i$ amplifies the received main signal, and supplies the amplified main signal and the pumping light $PL_i$ to the downstream repeater $R_{i+1}$ via the transmission line $TL_i$.

Figure 2:
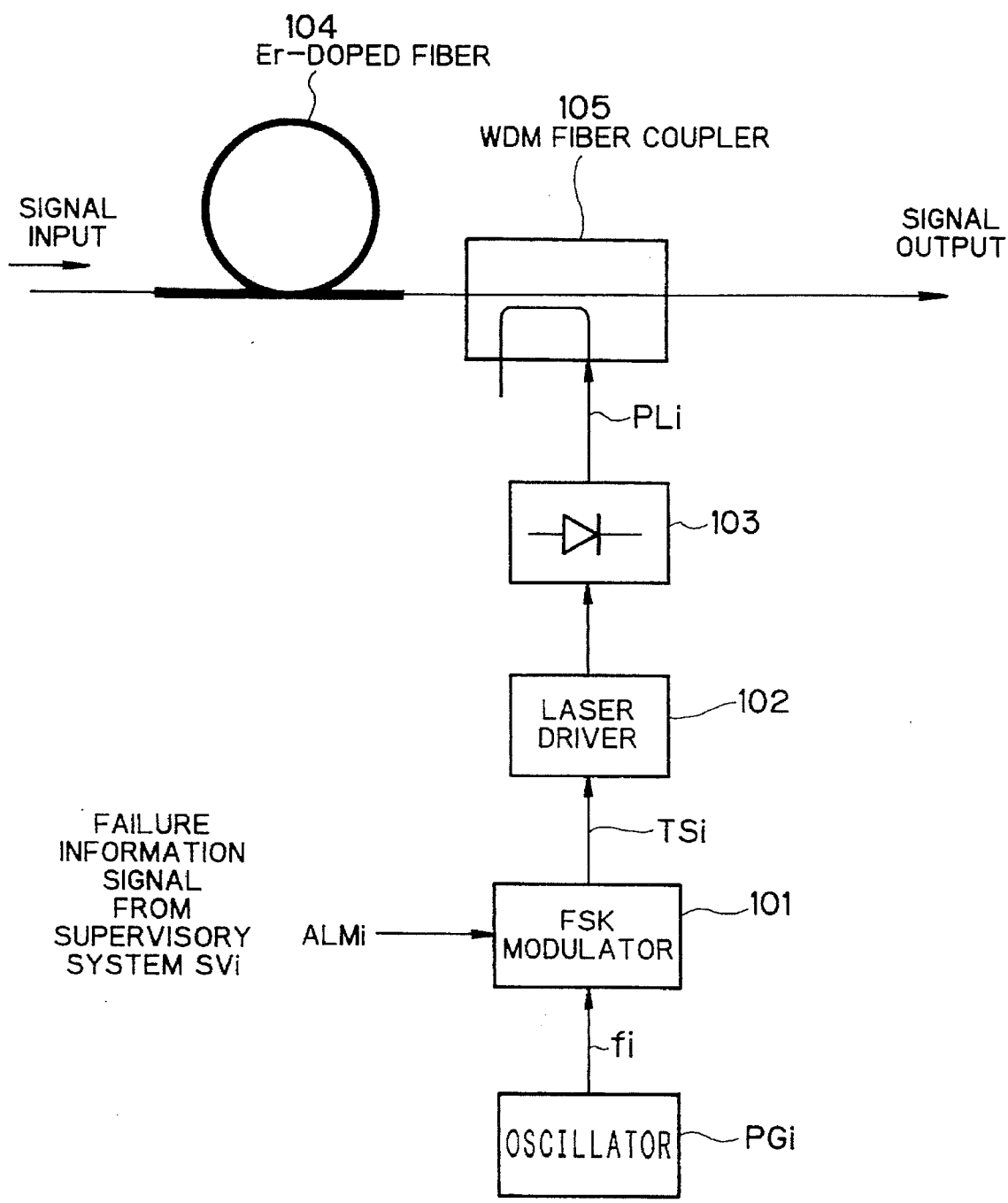
FIG. 2 is a block diagram showing a more specific configuration of a repeater of the embodiment.

FIG. 2 shows a more specific configuration of each repeater $R_i$. In this example, frequency shift keying (FSK) is employed as a modulation scheme, and an Er-doped fiber is employed as an optical amplifier. In FIG. 2, the FSK modulator 101FSK-modulates the oscillation wave of frequency $f_i$ generated by the oscillator $PG_i$, and supplies a resulting FSK-modulated oscillation wave $TS_i$ to a laser driver 102. The laser driver 102 drives a laser diode 103 in accordance with the FSK-modulated oscillation wave TSi, and the laser diode 103 emits pumping light $PL_i$, which is input to a WDM (wavelength division multiplexing) fiber coupler 105. The pumping light $PL_i$ is wavelength-multiplexed with the transmitting signal light by the WDM fiber coupler 105.

Inputting to the Er-doped fiber 104 through the WDM fiber coupler 103, the pumping light $PL_i$ pumps the Er-doped fiber 104 to thereby amplify the input signal light. Further, the pumping light $PL_i$ is wavelength-multiplexed with the transmitting signal light through the WDM fiber coupler 105 and is sent out to the optical fiber transmission line $TL_i$. For example, the wavelengths of the main signal light for transmission and the pumping light $PL_i$ for pumping the Er-doped fiber 104 are set at 1.52–1.55 µm and 1.46–1.48 µm, respectively.

Figure 3:
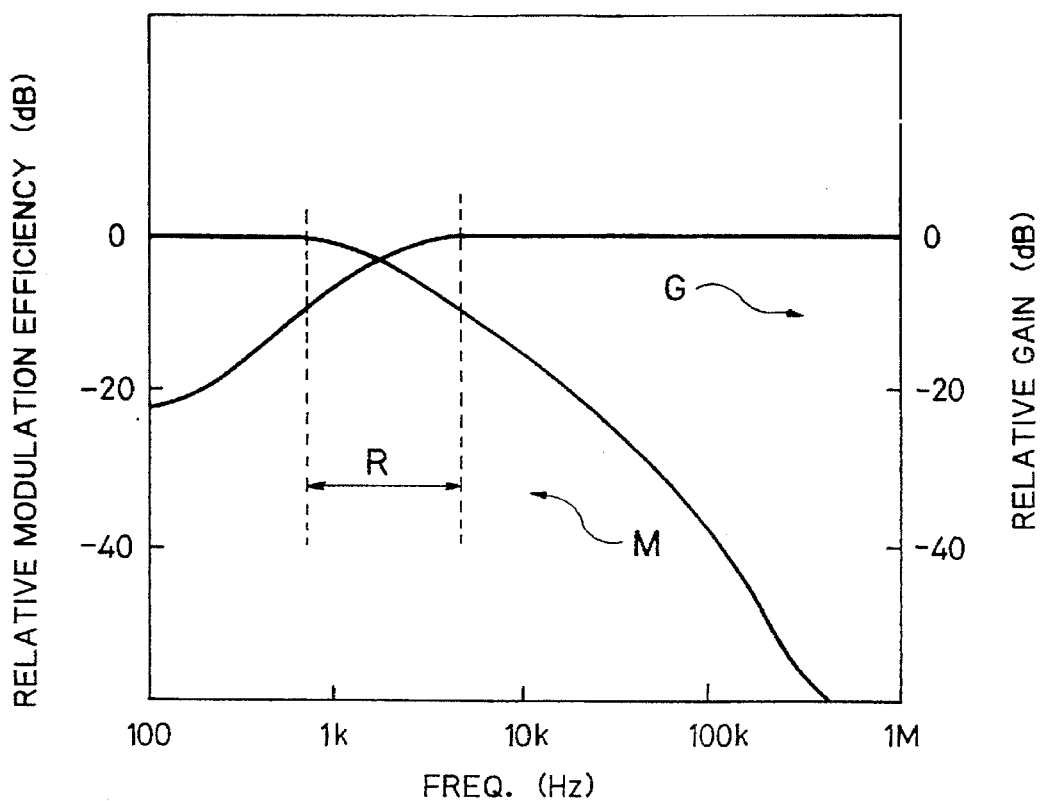
FIG. 3 is a graph showing frequency characteristics of the relative modulation efficiency and the relative gain in a repeater.

As shown In FIG. 3, the usable range of the FSK modulation central frequencies $f_1$–$f_n$ that are assigned to the respective repeaters $R_1$–$R_n$ is determined in consideration of the gain of the Er-doped fiber 104 and the modulation efficiency of the pumping light $PL_i$.

A characteristic curve G in FIG. 3 represents a variation of the gain of a certain Er-doped fiber with respect to the modulation central frequency $f_i$ of the pumping light $PL_i$ when the main signal light and the modulated pumping light $PL_i$ are input to the Er-doped fiber. In the range where the modulation central frequency $f_i$ of the pumping light $PL_i$ is lower than the frequency range R, the gain of the Er-doped fiber 104 becomes lower, so that the signal light may be prevented from reaching a receiving terminal if there exist a large number of repeaters.

A characteristic curve M represents a variation of the amplitude modulation efficiency of the pumping light $PL_i$ with respect to the modulation central frequency $f_i$ of the pumping light $PL_i$ when the pumping laser diode 103 is subjected to amplitude-modulation by the FSK-modulated oscillation wave $TS_i$. The range where the modulation central frequency $f_i$ of the pumping light $PL_i$ is higher than the frequency range R is not suitable for practical use, because in that range the amplitude modulation efficiency is too low.

Figure 4:
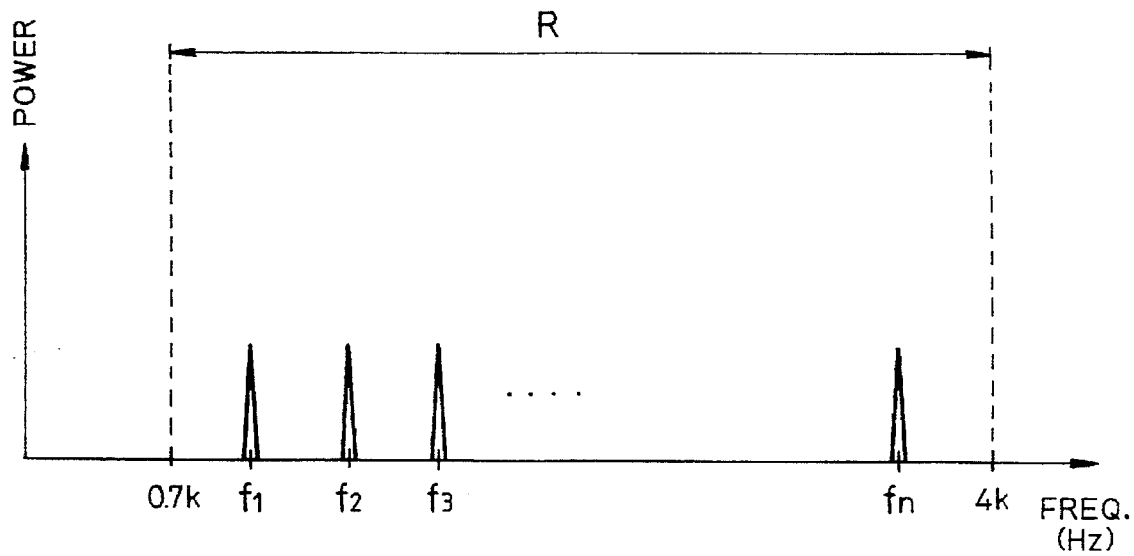
FIG. 4 is a frequency spectrum diagram showing an example of assigning respective frequencies to the repeaters of the embodiment.

It is therefore necessary to set the central frequency $f_i$ of the FSK-modulated oscillation wave $TS_i$ within the frequency range R, where both characteristics G and M are appropriate as shown in FIG. 3. In this embodiment, the usable frequency range R is 0.7–4 kHz. Therefore, as shown in FIG. 4, the oscillation frequencies $f_1$–$f_n$ of the oscillators $PG_1$–$PG_n$ are set, for instance, at regular intervals in the frequency range R (0.7–4 kHz). In this manner, the n alarm information signals $ALM_1$–$ALM_n$ can be transmitted by wavelength multiplexing.

As shown in FIG. 5, a receiving terminal has a configuration which can reproduce a plurality of alarm information signals. Upon reception of signal light from the optical fiber transmission line $TL_n$, an optical receiver 201 separates main signal light from the received light and converts it to an electrical signal. The separated main signal is decoded into an original data by a decoder 202. On the other hand, the remaining of the input signal other than the main signal is frequency-divided by a divider 203 into signal components $TS_1$–$TS_n$ of frequencies $f_1$–$f_n$, which are demodulated into alarm information signals $ALM_1$–$ALM_n$ by FSK demodulators $DEM_1$–$DEM_n$, respectively. The alarm information signals $ALM_1$–$ALM_n$ are supplied to an alarm information signal processor 204. If there exists an alarm information signal indicating "abnormality", the alarm information signal processor 204 sends out alarm information identifying the repeater corresponding to the alarm information signal indicating "abnormality" to a network controller (not shown).

A description will be made of transfer of alarm information signals in the optical transmission system that is constructed as described above. It is assumed that in the two repeaters $R_1$ and $R_n$ the failure supervisory systems $SV_1$ and $SV_n$ have detected some failures and have output alarm information signals $ALM_1$ and $ALM_n$ indicating "abnormality" to modulators $MOD_1$ and $MOD_n$, respectively.

According to the alarm information signal $ALM_1$, the modulator $MOD_1$ of the repeater $R_1$ FSK-modulates an oscillation wave of frequency $f_1$ that is supplied from the oscillator $PG_1$. The pumping source $PS_1$ is subjected to modulation in accordance with the FSK-modulated oscillation wave $TS_1$, so that pumping light $PL_1$ carrying the alarm information signal $ALM_1$ pumps the optical fiber amplifier $FA_1$ comprising an Er-doped fiber. As a result, main signal light is optically amplified by the optical fiber amplifier $FA_1$, and is wavelength-multiplexed with the pumping light $PL_1$ that carries the alarm information signal $ALM_1$. The resulting signal light is sent out to the optical fiber transmission line $TL_1$.

The repeater $R_2$ operates normally. Therefore, upon reception of the signal light carrying the main signal and the alarm information signal $ALM_1$, the optical fiber amplifier $FA_2$ of the repeater $R_2$ optically amplifies the signal light, multiplexes it with the pumping light $PL_2$ that carries an alarm information signal $ALM_2$ indicating "normal", and finally sends out the resulting signal light to the transmission line $TL_2$. Similarly, alarm information signals $ALM_3$–$ALM_{n-1}$ each indicating "normal" are superimposed in the respective repeaters $R_3$–$R_{n-1}$. The repeater $R_n$ receives and optically amplifies the signal light on which the main signal and the alarm information signals $ALM_1$–$ALM_{n-1}$ are superimposed, further superimposes alarm information signal $ALM_n$ indicating "abnormality" on the signal light, and sends out the resulting signal light to the receiving terminal.

In the receiving terminal, as shown in FIG. 5, the optical receiver 201 separates the main signal, and the divider 203 frequency-divides the remaining input signal into the respective components of frequencies $f_1$–$f_n$, which are FSK-demodulated into the respective alarm information signals ALM$_1$–ALM$_n$. Upon reception of the alarm information signals ALM$_1$–ALM$_n$, the alarm information signal processor 204 searches for alarm information signals indicating "abnormality". In this example, since the alarm information signals ALM$_1$ and ALM$_n$ indicate "abnormality", the alarm information signal processor 204 sends out, to the network controller, alarm information including location information indicating the repeaters R$_1$ and R$_n$ in which failures have occurred. In response, the network controller quickly performs emergency control processing such as switching of transmission lines.

FIG. 6 shows another example of a receiving terminal. Upon reception of signal light from the optical fiber transmission line TL$_n$, a wavelength divider 301 divides the received signal light into main signal light and the remaining. The main signal light is converted to an electrical main signal by an optical/electrical (O/E) device 302 and the main signal is decoded into an original data by a decoder 202. On the other hand, the remaining light is converted to an electrical signal by an O/E device 303 and the electrical signal is frequency-divided by a divider 203 into signal components TS$_1$–TS$_n$ of frequencies f$_1$–f$_n$, which are demodulated into alarm Information signals ALM$_1$–ALM$_n$ by FSK demodulators DEM$_1$–DEM$_n$, respectively. The alarm information signals ALM$_1$–ALM$_n$ are supplied to an alarm information signal processor 204. If there exists an alarm information signal indicating "abnormality", the alarm information signal processor 204 sends out alarm information Identifying the repeater corresponding to the alarm information signal indicating "abnormality" to a network controller (not shown).

Although in the above embodiment the optical fiber amplifier is an Er-doped fiber, it is not limited thereto but may be other rare-earth-element-doped fibers as long as they are in-line optical amplifiers that can be pumped by pumping light.

As described above in detail, in the failure information transmission scheme according to the invention, oscillation waves of different central frequencies are frequency-modulated in accordance with failure information generated in a plurality of repeaters, and are transferred by frequency multiplexing. Therefore, plural pieces of failure information can be transferred together by using the pumping light of a single wavelength.

What is claimed is:

1. An optical transmission system comprising a plurality of optical repeaters, each said optical repeater comprising:

in-line amplifying means for optically amplifying line-signal light, said amplifying means being pumped by pumping light;

oscillating means for generating an oscillation wave of a frequency different from that of an oscillation wave generated by an oscillating means of another optical repeater, said frequency being determined based on a gain of said in-line amplifying means and a modulation efficiency of said pumping light;

modulation means for frequency-modulating said oscillation wave based on repeater information which is generated in said optical repeater;

light-emitting means for generating said pumping light which is modulated according to said oscillation wave frequency-modulated by said modulation means; and combining means for optically combining said pumping light generated by said light-emitting means with said line-signal light.

2. The optical transmission system according to claim 1, wherein said modulation means comprises a FSK (Frequency Shift Keying) modulator.

3. The optical transmission system according to claim 1, wherein said light-emitting means comprises a semiconductor laser.

4. The optical transmission system according to claim 1, wherein said combining means comprises an optical coupler for optically multiplexing said pumping light generated by said light-emitting means with said line-signal light.

5. The optical transmission system according to claim 1, wherein a main signal is transmitted from a transmitting terminal to a receiving terminal through said optical repeaters, said receiving terminal comprising:

receiving means for receiving said line-signal light to output said main signal and the remaining signal;

frequency-dividing means for dividing said remaining signal into a plurality of signals having different frequencies respectively corresponding to said oscillation waves generated in said optical repeaters; and demodulation means for demodulating each of said signals having said different frequencies to reproduce said repeater information of each said optical repeater.

6. The optical transmission system according to claim 5, wherein said receiving means comprises:

dividing means for dividing said line-signal light into main signal light and the remaining light which are different in wavelength from each other;

first conversion means for converting said main signal light to said main signal; and second conversion means for converting said remaining light to said remaining signal.

7. In an optical transmission system comprising a plurality of optical repeaters each comprising an optical amplifier for optically amplifying line-signal light and a pumping source for optically pumping said optical amplifier, a repeater information transfer system comprising:

oscillating means for generating oscillation waves of different frequencies in said optical repeaters, respectively, said frequencies being determined for each of said optical repeaters based on a gain of said optical amplifier of each of said respective optical repeaters and a modulation efficiency of pumping light emitted by said pumping source of each of said respective optical repeaters;

modulation means for frequency-modulating said oscillation waves based on respective repeater information signals which are generated in said optical repeaters;

control means for controlling light-emitting operation of said pumping sources according to said oscillation waves frequency-modulated, respectively; and coupling means for coupling said pumping sources to a transmission line of said optical transmission system, respectively.

8. The repeater information transfer system according to claim 7, wherein said modulation means employs a FSK (Frequency Shift Keying) modulation scheme.

9. The repeater information transfer system according to claim 7, wherein said coupling means comprises a plurality of optical multiplexing couplers for optically multiplexing pumping light respectively generated by said pumping sources with said line-signal light.

10. The repeater information transfer system according to claim 7, wherein a main signal is transmitted from a transmitting terminal to a receiving terminal through said optical repeaters, said terminal comprising:

receiving means for receiving said line-signal light to output said main signal and the remaining signal;

frequency-dividing means for dividing said remaining signal into a plurality of signals having different frequencies respectively corresponding to said oscillation waves respectively generated in said optical repeaters; and demodulation means for demodulating each of said signals having said different frequencies to reproduce said repeater information signals of said optical repeater.

11. The optical transmission system according to claim 10, wherein said receiving means comprises:

dividing means for dividing said line-signal light into main signal light and the remaining light which are different in wavelength from each other;

first conversion means for converting said main signal light to said main signal; and second conversion means for converting said remaining light to said remaining signal.

12. In an optical transmission system comprising a plurality of optical repeaters each comprising an optical amplifier for optically amplifying line-signal light and a pumping source for optically pumping said optical amplifier, a repeater information transfer method comprising the steps of:

generating oscillation waves of different frequencies in said optical repeaters, respectively, said frequencies being determined for each of said optical repeaters based on a gain of said optical amplifier of each of said respective optical repeaters and a modulation efficiency of pumping light emitted by said pumping source of each of said respective optical repeaters;

frequency-modulating said oscillation waves based on respective repeater information signals which are generated in said optical repeaters;

controlling light-emitting operation of said pumping sources according to said oscillation waves frequency-modulated, respectively; and coupling said pumping sources to a transmission line of said optical transmission system, respectively.

13. The method according to claim 12, wherein said frequency-modulating step employs a FSK (Frequency Shift Keying) modulation scheme.

14. The method according to claim 12, wherein each of said pumping sources comprises a semiconductor laser.

15. The method according to claim 12, said optical transmission system transmitting a main signal from a transmitting terminal to a receiving terminal through said optical repeaters, the method further comprising the steps of:

receiving said line-signal light to output said main signal and the remaining signal;

frequency-dividing said remaining signal into a plurality of signals having different frequencies respectively corresponding to said oscillation waves generated in said optical repeaters; and demodulating each of said signals having said different frequencies to reproduce said repeater information of each said optical repeater.

16. A system as claimed in claim 7, wherein each of said plurality of optical repeaters has an oscillating means which generates oscillation waves having a frequency unique to that optical repeater.

17. A method as claimed in claim 12, wherein said generating step comprises a step of generating, in each of said optical repeaters, oscillating waves having a frequency unique to that repeater.

18. A system as claimed in claim 1, wherein said modulation means frequency-modulates said oscillation wave based on said repeater information during a condition when said repeater information indicates that said repeater is operating normally and during another condition when said repeater information indicates that said repeater is operating abnormally.

19. A system as claimed in claim 7, wherein said modulation means frequency-modulates said oscillation waves based on said repeater information during a condition when said repeater information indicates that said repeater is operating normally and during another condition when said repeater information indicates that said repeater is operating abnormally.

20. A method as claimed in claim 12, wherein said oscillation waves are modulated in said frequency-modulating step based on said repeater information during a condition when said repeater information indicates that said repeater is operating normally and during another condition when said repeater information indicates that said repeater is operating abnormally.

21. An optical transmission system according to claim 1, wherein said frequency is selected from the range of 0.7 to 4 kHz.

22. A repeater information transfer system according to claim 7, wherein each of said frequencies is selected from the range of 0.7 to 4 kHz.

23. A repeater information transfer method according to claim 12, wherein each of said frequencies is selected from the range of 0.7 to 4 kHz.

* * * * *